(12) United States Patent
Rondeau et al.

(10) Patent No.: US 6,355,334 B1
(45) Date of Patent: Mar. 12, 2002

(54) TRANSPARENT SUBSTRATE PROVIDED WITH A THIN-FILM STACK

(75) Inventors: Véronique Rondeau, Drancy (FR); Fabrice Didier, Köln (DE)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/422,941

(22) Filed: Oct. 22, 1999

(30) Foreign Application Priority Data

Oct. 22, 1998 (FR) .............................................. 98 13249

(51) Int. Cl.⁷ ................................................. B32B 7/00
(52) U.S. Cl. ...................... 428/212; 428/432; 428/697; 428/689; 359/350; 359/580
(58) Field of Search ................................ 428/212, 426, 428/428, 446, 688, 697, 698, 457; 359/350, 580, 585, 586

(56) References Cited

U.S. PATENT DOCUMENTS

| | | | |
|---|---|---|---|
| 4,996,105 A | * 2/1991 | Oyama et al. ............... | 428/336 |
| 5,110,662 A | 5/1992 | Depauw et al. | |
| 5,279,722 A | 1/1994 | Szczyrbowski et al. | |
| 5,709,930 A | 1/1998 | DePauw | |
| 6,020,077 A | * 2/2000 | Schicht et al. .............. | 428/622 |
| 6,045,896 A | * 4/2000 | Boire et al. ................. | 428/216 |

FOREIGN PATENT DOCUMENTS

| | | |
|---|---|---|
| DE | 19530331 | 2/1996 |
| EP | 0543077 | 5/1993 |
| EP | 0718250 | 6/1996 |
| EP | 0747330 | 12/1996 |
| FR | 2641271 | 7/1990 |

* cited by examiner

Primary Examiner—Deborah Jones
Assistant Examiner—Gwendolyn Blackwell-Rudasill
(74) Attorney, Agent, or Firm—Pennie & Edmonds LLP

(57) ABSTRACT

The invention relates to a transparent substrate, in particular made of glass, provided with a thin-film stack including at least one metallic layer with infrared reflection properties, in particular a low-emission layer, arranged between two dielectric-based coatings.

According to the invention, the dielectric-based coating above the metallic layer has the following sequence of layers deposited in this order:

a) layer(s) with material(s) with refractive index $n_{i-2}$ of at most 2.2;

b) layer(s) with material(s) with refractive index $n_{i-1}$ at least 0.3 less than that of the last layer(s) $n_i$;

c) last layer(s) with material(s) with refractive index $n_i$ substantially equal to $n_{i-2}$.

24 Claims, 1 Drawing Sheet

TRANSPARENT SUBSTRATE PROVIDED WITH A THIN-FILM STACK

BACKGROUND OF THE INVENTION

The present invention relates to a transparent substrate, in particular made of glass, provided with a thin-film stack including at least one metallic layer with infrared reflection properties, in particular a low-emissivity layer, arranged between two dielectric-based coatings.

The main application which the invention addresses is the use of such a substrate for the manufacture of thermal-insulation and/or solar-protection windows.

These are intended to be fitted both to buildings and to vehicles, in particular with a view to decreasing the air-conditioning work load and/or reducing excessive overheating entailed by the ever-increasing size of glazed areas in rooms and passenger compartments.

One type of thin-film stack well known for giving a transparent substrate thermal properties, in particular low-emissivity properties, which is suited to the aforementioned required application consists of a metallic layer, in particular made of silver, arranged between two dielectric-based coatings of the metal oxide or nitride type. This stack is, in the usual way, manufactured using a sequence of depositions carried out using a vacuum technique, for example cathode sputtering, where appropriate assisted by a magnetic field.

A metallic overcoat having a protective role for preventing degradation of the silver may also be provided in this stack.

In this type of stack, the silver layer essentially dictates the thermal, solar-protection and/or low-emissivity performance of the final window, whereas the dielectric layers primarily affect the optical appearance of the window obtained through interference. They furthermore have a function of protecting the silver layer against chemical and/or mechanical attack.

The improvements made to windows provided with stacks of the aforementioned type have so far allowed their field of application to be increased, while allowing them to keep a satisfactory level of thermal and optical performance. Regarding the latter point, however, colorimetric appearance is susceptible of yet further improvement, in particular with a more neutral colour in reflection.

SUMMARY OF THE INVENTION

The object of the invention is therefore to provide a substrate provided with a thin-film stack of the aforementioned type, having an improved colorimetric appearance, in particular with a more neutral colour in reflection.

To that end, the invention relates to a transparent substrate, in particular made of glass, provided with a thin-film stack including at least one metallic layer with infrared reflection properties, in particular a low-emission layer, arranged between two dielectric-based coatings, above the metallic layer. According to the invention, the dielectric-based coating has the sequence of layers deposited in this order:

a) layer(s) with material(s) with refractive index $n_{i-2}$ of at most 2.2 b) layer(s) with material(s) with refractive index $n_{i-1}$ at least 0.3 less than that of the last layer(s) $n_i$;

c) last layer(s) with material(s) with refractive index $n_i$ substantially equal to $n_{i-2}$.

It is to be pointed out that, in the scope of the invention, the term "last layer(s) in the stack" is to be understood as meaning the layer(s) in the stack furthest away from the substrate, which comprises the one directly in contact with the environment such as air.

The solution according to the invention gives an advantageous yet very unexpected result.

By way of explanation, until now in order to have a notable antireflection effect for the type of stack which the invention addresses, it had been necessary to obtain a dielectric-base upper coating in which the layer directly in contact with the protective metallic layer was a layer based on a material with high refractive index, which material had the advantage of "antireflecting" the metallic layer with infrared reflection properties. This upper coating was preferably terminated by an "index grading" with a last layer in contact with the environment such as air, with a refractive index closest to that of the latter, of the order of 1.7.

This was justified by the fact that the reflection at the interface between the last layer in the stack and the air is all the less as the difference in index between the material and the air decreases.

Surprisingly, it has been found that, for the type of stack addressed by the invention, the desired antireflection effect was obtained in spite of the presence of a last layer with high refractive index in contact with the environment such as air, by using the sequence according to the invention.

Furthermore, consequently, the substrates provided with the stack according to the invention have a neutral colour in reflection, even in configurations where the metallic functional layer, such as silver, has a large geometrical thickness.

The windows obtained by incorporating such substrates therefore both are highly aesthetic and have very good performance from a thermal point of view.

There are many advantages resulting from the sequence of the stack according to the invention compared with the sequences according to the prior art, according to which it is necessary to have index grading in order to obtain a satisfactory colour in reflection.

Specifically, because, according to the invention, the last layer has a high refractive index, it is readily possible to choose a constituent material for it which considerably improves the mechanical durability of the stack, such as a material based on $SnZnO_x$, or which gives it a "temperable" character without modification to its properties, such as a material based on $Si_3N_4$.

The functional metallic layer is advantageously made of silver. Its thickness may be selected between 7 and 20 nanometers, in particular between 9 and 15 nanometers, when it is desired to obtain windows with low emissivity and high optical transmission (in particular a $T_L$ of at least 70 to 80%), particularly for those intended to be fitted to buildings in cold countries. When the desire is for reflective windows with a solar-protection function, which are intended rather to be fitted to buildings in hot countries, the silver layer may be thicker, for example between 20 and 25 nm (which clearly has the consequence of having windows with much lower optical transmission, for example less than 60%).

Preferably, provision may be made for the stack according to the invention to have a protective metallic layer placed immediately above and in contact with the layer with infrared reflection properties.

The protective layer provided is advantageously based on a single metal selected from niobium Nb, titanium Ti, chromium Cr or nickel Ni or an alloy of at least two of these metals, in particular an alloy of nickel and chromium (Ni/Cr), and has a geometrical thickness of less than or equal to 2 nanometers. According to this variant, the metal or the alloy constituting the layer may be doped with palladium Pd.

It fulfils its role as a "sacrificial" layer with the aim of protecting the functional layer in the case of depositing the next layer by reactive sputtering.

The dielectric-based coating lying underneath the metallic layer with infrared reflection properties is advantageously a superposition of at least two layers. It may be two layers, notably the superposition of two metallic oxide layers or the superposition of a nitride layer like AlN or Si3N4 and a metallic oxide layer like SnO2, ZnO, TiO2. Preferably, there is a direct contact between siad coating and said metallic reflecting layer. A preferred embodiment consists of a coating having a wetting layer based on zinc oxide ZnO, optionally doped with aluminium ZnO:Al, in contact with the said layer with infrared reflection properties. The coating contains preferably two layers including this wetting layer. The geometrical thickness of the wetting layer is preferably between 5 and 40 nanometers, in particular between 15 and 30 nanometers. With such thicknesses, further to its wetting function, it can contribute to adjusting the optical appearance of the stack in combination with the first dielectric coating lying above the functional layer. The wetting layer can advantageously be based on partly crystallized zinc oxide.

Such a layer makes it possible to avoid penalizing the stack from an optical point of view in the case when the carrier substrate subjects it to a heat treatment of the bending or tempering type.

According to one highly advantageous characteristic of the invention, the last layer(s) in the stack may furthermore be a metal oxide layer selected from one of the following materials: tin oxide $SnO_2$, zinc oxide, mixed oxide of tin and zinc $SnZnO_x$. It may also be a metal nitride layer, optionally an oxygen-diffusion barrier, selected from one of the following materials: silicon nitride $Si_3N_4$, optionally doped with aluminium $Si_3N_4$:Al, aluminium nitride AlN.

Lastly, it may a carbide layer, optionally an oxygen-diffusion barrier, selected from one of the following materials: SiC, TiC, CrC, TaC.

As mentioned above, such a layer makes it possible to improve the durability of the stack and/or give it a "temperable" character.

This last layer preferably has a geometrical thickness of between 5 and 20 nanometers. Advantageously, the layer placed immediately underneath and in contact with one of the last layers in the stack has a refractive index $n_{i-1}$ of less than 1.75.

This layer is preferably based on silicon oxide $SiO_2$ or aluminium oxide $Al_2O_3$ or a mixture of these two oxides $Al_2O_3$:$SiO_2$.

According to an additional characteristic of the invention, the layer underlying the layer placed immediately underneath and in contact with one of the last layers has a refractive index $n_{i-2}$ close to that of the last layer in the stack, preferably of the order of 2.

By way of preferred illustration, the stack of layers meeting the criteria of the invention is of the type:

Glass/SnO$_2$ or Si$_3$N$_4$:Al or AlN/ZnO or ZnO:Al/Ag/Ti or NiCr/ZnO or SnO$_2$/SiO$_2$ or Al$_2$O$_3$ or SiO$_2$:Al$_2$O$_3$/SnO$_2$ or ZnO or SnZnO$_x$ or AlN or Si$_3$N$_4$:Al or (AlN/ Si$_3$N$_4$:Al) or (Si$_3$N$_4$:Al/AlN) or (SnO$_2$/SnZnO$_x$)

The substrate according to the invention is also noteworthy in that it has an emissivity ε of at most 0.05.

The invention which has just been described is susceptible of very many applications. This may involve, in particular, low-emission or solar-protection multiple glazing, in particular double glazing, having the substrate defined above, the stack of layers being at faces 2 and/or 3, and where appropriate, at face 5.

It also relates to low-emission or solar-protection double glazing having at least one substrate defined above, noteworthy in that it has an optical transmission $T_L$ of at least 72%.

Such double glazing having two panes of glass is also noteworthy in that it has a coefficient K less than or equal to 1.4 W/K.m$^2$ when the two panes of glass are separated by a layer of air, or less than or equal to 1.1 W/K.m$^2$ when the panes of glass are separated by a layer of argon.

BRIEF DESCRIPTION OF THE DRAWINGS

Other details and advantageous characteristics will become apparent on reading the detailed description of the following nonlimiting examples which are given with reference to FIGS. 1 and 2.

DETAILED DESCRIPTION OF THE DRAWINGS

In these two examples, the successive thin-film depositions were carried out using a technique of cathode sputtering assisted by a magnetic field. In the scope of the invention, they can quite clearly be carried out using any other technique which allows the thicknesses of the layers obtained to be controlled properly.

The substrates on which the thin-film stacks were deposited are substrates made of clear silica-soda-lime glass of the type marketed by the company SAINT-GOBAIN VITRAGE under the name PLANILUX.

EXAMPLE 1

Comparative

Figure 1:
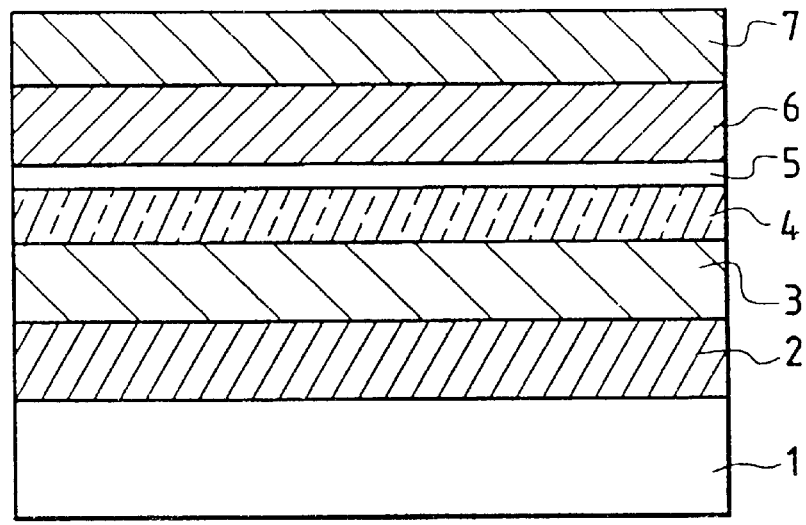
FIG. 1 is a comparative example.

FIG. 1 shows that, in accordance with what has been described in Patent Application EP-0 818 250, on top of the substrate 1 there is a barrier layer 2 against the diffusion of oxygen and Na$^+$ ions, based on SnO$_2$, a wetting layer 3 based on zinc oxide ZnO, then a layer 4 of silver, a protective layer 5 of titanium Ti, a layer 6 based on zinc oxide ZnO and, lastly, an oxygen-barrier layer 7 based on Si$_3$N$_4$. It is to be pointed out that, for the sake of clarity, the various proportions between the thicknesses of the materials have not been respected.

The stack is therefore of the type:

Glass/SnO$_2$/ZnO/Ag/Ti/ZnO/Si$_3$N$_4$

Table 1 below indicates the thickness in nanometers corresponding to each layer in the stack on top of the 4 mm-thick substrate.

TABLE 1

| SnO$_2$ | (2) | 17 |
|---|---|---|
| ZnO | (3) | 12 |
| Ag | (4) | 12 |
| Ti | (5) | 1.2 |
| ZnO | (6) | 27 |
| Si$_3$N$_4$ | (7) | 20 |

In order to produce this stack, the recommended deposition conditions for each of the layers are the following:

The layer 2 based on SnO$_2$ was deposited using a tin target, under a pressure of 1.5×10$^{-3}$ mbar, in an argon/O$_2$ atmosphere.

The layers 3 to 6 based on zinc oxide ZnO were deposited using a zinc target, under a pressure of 8×10$^{-3}$ mbar, in an argon/oxygen atmosphere, The layer 4 of silver was deposited using a silver target, under a pressure of $8\times10^{-3}$ mbar, in an argon atmosphere.

The layer 5 of Ti was deposited using a titanium target, under a pressure of $8\times10^{-3}$ mbar, in an argon atmosphere, The layer 7 of $Si_3N_4$ was deposited using a silicon target doped with 8% aluminium, under a pressure of $8\times10^{-3}$ mbar, in an argon/nitrogen atmosphere.

The powers and the rates of movement of the substrate were adjusted in a manner which is known per se in order to obtain the desired thicknesses above.

Table 2 below indicates respectively the optical transmission value $T_L$ as a percentage, the optical reflection value $R_L$, also as a percentage, the values a*® and b*®, in reflection, in the (L, a*, b*) colorimetry system, no units, as well as the emmissivity value $\epsilon$, no units. All these measurements are made with reference to the $D_{65}$ illuminant.

TABLE 2

| Example 1 - (Monolithic substrate 1) | |
| --- | --- |
| $T_L$ | 83.1 |
| $R_L$ | 9.34 |
| a* ® | 2.5 |
| b* ® | -12.9 |
| $\epsilon$ | 0.032 |

The substrate 1 defined above is then assembled as double glazing with another bare clear glass substrate with a geometrical thickness equal to 4 mm, with a 15 mm thick intermediate argon layer, the thin-film stack being at face 3.

The table 3 below again gives the same characteristics $T_L$, $R_L$, a*®, b*®, $\epsilon$ as well as the value of the coefficient K in $W/K.m^2$ of the double glazing.

TABLE 3

| Example 1 - (Double glazing) | |
| --- | --- |
| $T_L$ | 75.6 |
| $R_L$ | 15.6 |
| a* ® | 0.5 |
| b* ® | -7.7 |
| $\epsilon$ | 0.032 |
| K | 1.09 |

EXAMPLE 2

According to the Invention

Figure 2:
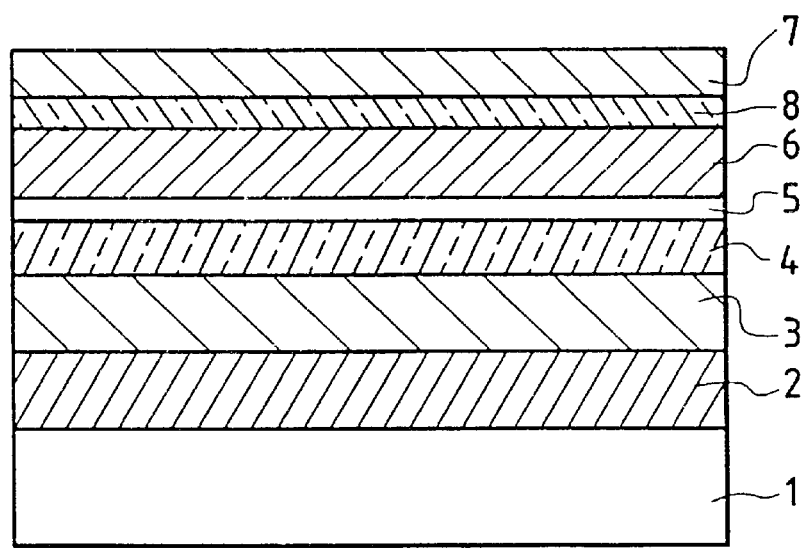
FIG. 2 is carried out in accordance with the invention.

The thin-film stack represented in FIG. 2 is identical to that in comparative example 1, except for the fact that a layer 8 based on $SiO_2$ with a refractive index equal to 1, 45 is arranged between the layer 6 based on zinc oxide ZnO and the last layer in the stack 7 based on silicon nitride $Si_3N_4$.

The stack therefore has the following sequence:

Glass/$SnO_2$/ZnO/Ag/Ti/ZnO/$SiO_2$/$Si_3N_4$

The layer 8 based on $SiO_2$ according to the invention has a thickness of 17 nm. The other layers have the same thicknesses as those relating to comparative example 1, except in the case of the thickness of $Si_3N_4$ overcoat which is here equal to 12 nm.

This layer 8 based on $SiO_2$ was deposited by plasma-assisted reactive sputtering in an argon/oxygen atmosphere at a pressure of about $1.5\times10^{-3}$ mbar.

Table 4 below respectively indicates the values $T_L$, $R_L$, a*®, b*® and $\epsilon$ of the monolithic substrate 1 relating to this example.

TABLE 4

| Example 2 - (Monolithic) | |
| --- | --- |
| $T_L$ | 82.8 |
| $R_L$ | 9.3 |
| a* ® | 3.0 |
| b* ® | -6.0 |
| $\epsilon$ | 0.032 |

This substrate 1 is then assembled to form double glazing with another clear glass substrate of the same thickness, equal to 4 mm, with a thick 15 mm intermediate argon layer, the stack according to the invention being at face 3 of this double glazing.

The table 5 below again gives the same characteristics $T_L$, $R_L$, a*®, b*®, $\epsilon$ as well as the value of the coefficient K in $W/K.m^2$ of the double glazing.

TABLE 5

| Example 2 - (Double glazing) | |
| --- | --- |
| $T_L$ | 75.3 |
| $R_L$ | 15.7 |
| a* ® | 0.9 |
| b* ® | -3.3 |
| $\epsilon$ | 0.032 |
| K | 1.09 |

By comparing the various tables relating to spectrophotometric values and the thermal performance, respectively of the comparative example according to the prior art and the example according to the invention, it is easy to see that:

the stack according to the invention gives the glazing substrate a better colorimetric appearance, with a more neutral colour in reflection, which is corroborated by very low values of a* and b*, this improvement in optical terms is not made to the detriment of the thermal performance.

Furthermore, the mechanical durability tests have demonstrated that the stack according to the invention has greater durability.

Lastly, the stack according to the invention can undergo heat treatments of the bending and/or tempering type without becoming degraded.

What is claimed is:

1. Transparent substrate, provided with a thin-film stack including at least one metallic layer with infrared reflection properties, arranged between two dielectric-based coatings, wherein the dielectric-based coating arranged above the metallic layer has the sequence of layers deposited in the following order:

a) one or more first layer(s) with materials(s) having a refractive index of at most 2.2;

b) one or more middle layer(s) with materials(s) having a refractive index of at least 0.3 less than one or more last layer(s) $n_i$; and c) one or more last layer(s) with material(s) having a refractive index, substantially equal to the refractive index of the one or more first layers.

2. Substrate according to claim 1, wherein the metallic layer with infrared reflection properties is based on silver Ag.

3. Substrate according to claim 1 wherein the metallic layer with infrared reflection properties is directly in contact with the underlying dielectric-based coating.

4. Substrate according to claim 1, wherein the metallic layer with infrared reflection properties has a geometrical thickness of between 7 and 20 nanometers.

5. Substrate according to claim 1, wherein the substrate has a protective metallic layer placed immediately above and in contact with the layer with infrared reflection properties.

6. Substrate according to claim 5, wherein the said protective metallic layer is based on a single metal selected from niobium Nb, titanium Ti, chromium Cr or nickel Ni or an alloy of at least two of these metals.

7. Substrate according to claim 1, wherein the dielectric-based coating lying underneath the metallic layer with infrared reflection properties is a superposition of at least two layers, notably two metallic oxide layers or a nitride layer like AlN or Si3N4 and a metallic oxide layer like SnO2, ZnO, TiO2, with preferably a direct contact between the said coating and the said metallic layer with infrared reflection properties.

8. Substrate according to claim 7, wherein the dielectric based coating underneath the metallic layer with infrared reflection properties has a wetting layer based on zinc oxide ZnO, optionally doped with aluminum ZnO:Al, in contact with the said layer with infrared reflection properties, and comprises preferably two layers including the said wetting layer.

9. Substrate according to claim 8, wherein the wetting layer has a geometrical thickness of between 5 and 40 nanometers.

10. Substrate according to one of claims 8 and 9, wherein the wetting layer is based on at least partly crystalized zinc oxide.

11. Substrate according to claim 1, wherein the last layer in the stack is a layer selected from one of the following materials: silicon nitride $Si_3N_4$, optionally doped with aluminum $Si_3N_4$:Al, aluminum nitride AlN, tin oxide $SnO_2$, mixed oxide of tin and zinc $SnZnO_x$, and carbides such as SiC, TiC, CrC, TaC.

12. Substrate according to claim 1, wherein the last layer in the stack has a geometrical thickness of between 5 and 20 nanometers.

13. Substrate according to claim 1, wherein the layer placed immediately underneath and in contact with one of the last layers in the stack has a refractive index of less than 1.75.

14. Substrate according to claim 1, wherein the layer placed immediately underneath and in contact with one of the last layers is based on silicon oxide $SiO_2$ or aluminum oxide $Al_2O_3$ or a mixture of these two oxides $Al_2O_3$:$SiO_2$.

15. Substrate according to claim 1, wherein the layer underlying the layer placed immediately underneath and in contact with one of the last layers in the stack has a refractive index close to that of the last layer in the stack, preferably of the order of 2.

16. Substrate according to claim 1, wherein the stack is as follows:

Glass/$SnO_2$ or $Si_3N_4$:Al or AlN/ZnO or ZnO:Al/Ag/Ti or NiCr/ZnO or $SnO_2$/$SiO_2$ or $Al_2O_3$ or $SiO_2$:$Al_2O_3$/$SnO_2$ or ZnO or $SnZnO_x$ or AlN or $Si_3N_4$:Al or (AlN/$Si_3N_4$:Al) or ($Si_3N_4$:Al/AlN) or ($SnO_2$/$SnZnO_x$).

17. Substrate according to claim 1, wherein the substrate has an emissivity $\in$ of at most 0.05.

18. Low-emission or solar-protection multiple glazing, in particular double glazing, having the substrate according to claim 1, wherein the thin-film stack being at faces 2 and/or 3, and where appropriate, at face 5.

19. Low-emissivity double glazing having at least one substrate according to claim 1, wherein the substrate has an optical transmission $T_L$ of at least 72%.

20. Double glazing according to claim 19, having two panes of glass, wherein the double glazing has a coefficient K less than or equal to 1.4 W/K.m$^2$ when the two panes of glass are separated by air, or less than or equal to 1.1 W/K.m$^2$ when the two panes of glass are separated by argon.

21. Substrate according to claim 1, wherein the substrate is made of glass.

22. Substrate according to claim 4, wherein the metallic layer with infrared reflection properties has a geometric thickness between 9 and 15 nanometers, so as to give it low-emissivity properties, or between 20 and 25 nanometers so as to give it solar-protection properties.

23. Substrate according to claim 6, wherein the protective metallic layer is an alloy of niobium and chromium (Nb/Cr) or of nickel and chromium (Ni/Cr), and wherein the protective metallic layer has a geometrical thickness of less than or equal to 2 nanometers.

24. Substrate according to claim 9, wherein the wetting layer has a geometrical thickness of between 15 and 30 nanometers.

* * * * *